(12) United States Patent
Yasuda et al.

(10) Patent No.: US 12,398,217 B2
(45) Date of Patent: Aug. 26, 2025

(54) RUBBER COMPOSITION AND PNEUMATIC TIRE

(71) Applicant: SUMITOMO RUBBER INDUSTRIES, LTD., Hyogo (JP)

(72) Inventors: Rie Yasuda, Hyogo (JP); Ryoji Matsui, Hyogo (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 632 days.

(21) Appl. No.: 17/788,091

(22) PCT Filed: Dec. 21, 2020

(86) PCT No.: PCT/JP2020/047687
§ 371 (c)(1),
(2) Date: Jun. 22, 2022

(87) PCT Pub. No.: WO2021/132160
PCT Pub. Date: Jul. 1, 2021

(65) Prior Publication Data
US 2023/0042427 A1      Feb. 9, 2023

(30) Foreign Application Priority Data

Dec. 27, 2019    (JP) ................ 2019-238219

(51) Int. Cl.
| | | |
|---|---|---|
| *C08C 19/22* | (2006.01) | |
| *B60C 1/00* | (2006.01) | |
| *C08C 19/12* | (2006.01) | |
| *C08K 3/04* | (2006.01) | |
| *C08K 3/06* | (2006.01) | |
| *C08K 3/36* | (2006.01) | |
| *C08K 9/04* | (2006.01) | |

(52) U.S. Cl.
CPC ............ *C08C 19/22* (2013.01); *B60C 1/0016* (2013.01); *C08C 19/12* (2013.01); *C08K 3/04* (2013.01); *C08K 3/06* (2013.01); *C08K 3/36* (2013.01); *C08K 9/04* (2013.01)

(58) Field of Classification Search
CPC ........... C08C 19/22; C08C 19/12; C08K 3/04; C08K 3/06; C08K 3/36; C08K 9/04

USPC ........................................... 523/156
See application file for complete search history.

(56) References Cited

U.S. PATENT DOCUMENTS

| | | | |
|---|---|---|---|
| 5,132,348 A | 7/1992 | Saito et al. | |
| 2005/0075422 A1 | 4/2005 | Resendes et al. | |
| 2012/0214903 A1* | 8/2012 | Masumoto ............... | C08K 3/36 523/150 |
| 2017/0240731 A1 | 8/2017 | Yamashiro et al. | |
| 2018/0346694 A1 | 12/2018 | Fukunishi et al. | |

FOREIGN PATENT DOCUMENTS

| | | |
|---|---|---|
| CN | 104487506 A | 4/2015 |
| CN | 107057136 A | 8/2017 |
| EP | 3 178 879 A1 | 6/2017 |
| JP | H03-031339 A | 2/1991 |
| JP | 2004-244635 A | 9/2004 |
| JP | 2006-249189 A | 9/2006 |
| JP | 2010-185053 A | 8/2010 |
| JP | 2011-079912 A | 4/2011 |
| JP | 2014-105295 A | 6/2014 |
| JP | 2018-021145 A | 2/2018 |
| JP | 2018-039867 A | 3/2018 |
| JP | 2019-026791 A | 2/2019 |

OTHER PUBLICATIONS

Sallat, A. et al., "Viscoelastic and self-healing behavior of silica filled ionically modified poly(isobutylene-co-isoprene) rubber", RSC Advances, vol. 8, 2018, pp. 26793-26803.
ISR issued in International Application No. PCT/JP2020/047687, Mar. 2, 2021, translation.

* cited by examiner

*Primary Examiner* — Deve V Hall
(74) *Attorney, Agent, or Firm* — GREENBLUM & BERNSTEIN, P.L.C.

(57) ABSTRACT

Provided are a rubber composition which provides a self-healing rubber with improved strength and wet grip performance, and a pneumatic tire including the rubber composition. The present disclosure relates to a rubber composition containing a rubber component having a functional group containing a cationic functional group and/or an anionic functional group, a filler capable of generating a charge paired with the functional group, and sulfur.

12 Claims, No Drawings

RUBBER COMPOSITION AND PNEUMATIC TIRE

TECHNICAL FIELD

The present disclosure relates to a rubber composition and a pneumatic tire.

BACKGROUND ART

There has been a growing interest in rubbers capable of self-healing as a means of achieving longer rubber life, and various studies have been made (see, for example, Non-Patent Literature 1).

CITATION LIST

Patent Literature

Non-Patent Literature 1: Aladdin Sallat, et al., "Viscoelastic and self-healing behavior of silica filled ionically modified poly(isobutylene-co-isoprene) rubber", RSC Advances, 2018, 8, 26793-26803

SUMMARY OF DISCLOSURE

Technical Problem

The present inventors have conducted research and found that rubbers capable of self-healing provide good strength and good wet grip performance. However, as a result of further research, it has been found that there is room for further improvement.

The present disclosure aims to solve the above problem and provide a rubber composition which provides a self-healing rubber with improved strength and wet grip performance, and a pneumatic tire including the rubber composition.

Solution to Problem

In order to allow a rubber to have appropriate strength according to the intended use, the molecular chains need to be linked together. However, the linkages between the molecular chains can be broken if an input exceeding the strength of the linkages occurs. Thus, it is considered that the strength of the entire rubber will decrease as the deformation is repeated continuously. To overcome this problem, the present inventors have examined a self-healing rubber composition which combines a rubber (polymer) having a cationic functional group and/or an anionic functional group with a filler capable of generating a charge paired therewith to form reversible bonds such as metal coordination bonds, hydrogen bonds, or ionic bonds, thereby making it possible to reduce the decrease in strength due to repeated deformation of the rubber.

However, although the reversible bonds are capable of self-healing and have certain strength in the matrix, their strength is lower than that of covalent bonds. Then, the present inventors have conducted further research and found that by adding sulfur to the composition containing the polymer and the filler, the rubber composition having self-healing bonds can exhibit significantly improved strength and wet grip performance. This finding has led to the present disclosure.

Specifically, the present disclosure relates to a rubber composition, containing: a rubber component having a functional group containing at least one of a cationic functional group or an anionic functional group; a filler capable of generating a charge paired with the functional group; and sulfur.

Preferably, the functional group contains a cationic functional group and an anionic functional group.

Preferably, the filler contains at least one of a cationic functional group or an anionic functional group.

Preferably, the rubber component includes at least one selected from the group consisting of butyl rubbers, styrene-butadiene rubbers, and polybutadiene rubbers.

Preferably, the filler includes at least one selected from the group consisting of silica and carbon black.

Preferably, the cationic functional group includes at least one selected from the group consisting of a pyridine group, an imidazole group, a thiazole group, and an amino group, and the anionic functional group includes at least one selected from the group consisting of a halogen group and a carboxylic acid group.

Preferably, the cationic functional group includes an imidazole group, and the anionic functional group includes a halogen group.

Preferably, the rubber component has a cationic functional group content of 0.5 to 30% by mass, and the filler has an anionic functional group content of 5 to 70% by mass.

Preferably, the rubber component has an anionic functional group content of 0.5 to 30% by mass, and the filler has a cationic functional group content of 10 to 70% by mass.

Preferably, the rubber composition has a sulfur content of 0.3 to 6 parts by mass per 100 parts by mass of rubber components in the rubber composition.

Preferably, the rubber component includes at least one selected from the group consisting of butyl rubbers having a 1-butylimidazole group and a bromo group, butyl rubbers having a bromo group, styrene-butadiene rubbers having a carboxylic acid group, and styrene-butadiene rubbers having an amine group, and the filler includes at least one selected from the group consisting of silica having a hydroxy group, silica having a 1-butylimidazole group and a bromo group, silica having a bromo group, and silica having an amino group.

Preferably, the rubber composition satisfies the following relationship:

Filler content/Sulfur content×100≤40.

Preferably, the rubber composition is for use in a tread of a tire.

The present disclosure also relates to a pneumatic tire, including a tread including the rubber composition.

Advantageous Effects of Disclosure

The rubber composition of the present disclosure contains a rubber component having a functional group containing a cationic functional group and/or an anionic functional group, a filler capable of generating a charge paired with the functional group, and sulfur. Thus, excellent strength and wet grip performance are provided to a rubber composition having self-healing bonds.

DESCRIPTION OF EMBODIMENTS

The present disclosure provides a rubber composition containing a rubber component having a functional group containing a cationic functional group and/or an anionic functional group, a filler capable of generating a charge paired with the functional group in the rubber component, and sulfur.

In the rubber composition, reversible bonds can be formed between the charge generated by the functional group in the rubber component and the paired charge generated in the filler, and at the same time covalent bonds can be formed by sulfur crosslinking. Thus, strong covalent bonds are formed between the polymer molecules, and at the same time reversible bonds occur between the polymer and the filler. This enables that the weak reversible bonds are selectively cleaved upon deformation of the rubber component to absorb the deformation energy, while the covalent bonds ensure sufficient strength. Accordingly, it is believed that the strength of the entire rubber composition can be significantly improved.

Moreover, in the rubber composition, the bonds between the polymer and the filler are formed to some extent during kneading, so that the polymer molecules are restricted with a distance between them. Thus, it is considered that polysulfide bonds rather than monosulfide bonds are more likely to be formed in the subsequent sulfur crosslinking. As a result, the mobility of the polymer molecules is increased, and at the same time more energy loss occurs as the reversible bonds are cleaved upon deformation of the rubber. Accordingly, it is believed that wet grip performance can be significantly improved.

The functional group in the rubber component contains a cationic functional group and/or an anionic functional group, and the filler is capable of generating a charge paired therewith. For example, when the functional group of the rubber component contains a cationic functional group, the filler may be capable of generating at least a negative charge, while when the functional group of the rubber component contains an anionic functional group, the filler may be capable of generating at least a positive charge. When the functional group of the rubber component contains a cationic functional group and an anionic functional group, the filler may be capable of generating a positive charge alone, a negative charge alone, or both positive and negative charges.

Examples of the cationic functional group include a basic functional group. Examples of the basic functional group include an amino group, an imino group (=NH), an ammonium salt group, and a heterocyclic group having a basic nitrogen atom. The amino group may be a primary amino group (—NH$_2$), a secondary amino group (—NHR$^1$), or a tertiary amino group (—NR$^1$R$^2$). R$^1$ and R$^2$ are each, for example, an alkyl group, a phenyl group, or an aralkyl group, and the number of carbon atoms is preferably 1 to 8. Examples of the ammonium salt group include a tertiary ammonium salt group and a quaternary ammonium salt group. Examples of the heterocyclic group having a basic nitrogen atom include nitrogen-containing heterocyclic groups such as a pyridine group, a pyrimidine group, a pyrazine group, an imidazole group, a thiol-containing imidazole group, a triazole group, and a thiazole group. The heterocyclic group has double bonds and therefore can be easily dispersed in the rubber. Preferred among these are a pyridine group, an imidazole group, a thiazole group, and an amino group (amine group), with an imidazole group being more preferred, because, for example, they can easily interact with the filler to provide good strength.

Examples of the anionic functional group include a halogen group and an acidic functional group. Examples of the halogen group include a fluoro group, a chloro group, a bromo group, and an iodo group. Examples of the acidic functional group include a hydroxy group, a carboxylic acid group, a sulfonic acid group, a sulfuric acid group, a phosphonic acid group, a phosphoric acid group, a phosphinic acid group, a maleic acid group, an acid anhydride group (e.g., a maleic anhydride group), a fumaric acid group, an itaconic acid group, an acrylic acid group, a methacrylic acid group, and a mercapto group. From the standpoint of self-healing ability, a halogen group or a carboxylic acid group is preferred among these, with a halogen group (particularly a bromo group) being more preferred.

The functional group may contain a cationic functional group and an anionic functional group. In other words, the functional group may be an amphoteric (zwitter) ion functional group. When each of the functional groups is an amphoteric ion functional group, it is believed that during kneading, the positive charge in the functional group and the negative charge in the filler form ionic bonds, and the negative charge in the functional group and the positive charge in the filler form ionic bonds. Examples of such embodiments include an embodiment in which a nitrogen-containing heterocyclic group (cationic functional group) such as a thiazole group and a halogen group (anionic functional group) form an ionic bond, with a group represented by the following formula being preferred:

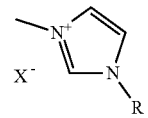

wherein X represents Br or Cl, preferably Br, and R represents a C1-C10, preferably C1-C4, alkyl group.

When the functional group contains a cationic functional group, the cationic functional group content of the rubber component is preferably 0.5% by mass or more, more preferably 1.0% by mass or more, still more preferably 1.5% by mass or more, but is preferably 30% by mass or less, more preferably 25% by mass or less, still more preferably 20% by mass or less. When the cationic functional group content is within the range indicated above, the advantageous effect tends to be better achieved. Similarly, when the functional group contains an anionic functional group, the anionic functional group content is preferably 0.5% by mass or more, more preferably 1.0% by mass or more, still more preferably 1.5% by mass or more, but is preferably 30% by mass or less, more preferably 25% by mass or less, still more preferably 20% by mass or less.

The respective functional group contents (% by mass) of the rubber component can be determined from the peaks corresponding to the respective functional groups measured by NMR.

Non-limiting examples of the rubber component include diene rubbers such as isoprene-based rubbers, polybutadiene rubbers (BR), styrene-butadiene rubbers (SBR), styrene-isoprene-butadiene rubbers (SIBR), ethylene-propylene-diene rubbers (EPDM), chloroprene rubbers (CR), and acrylonitrile-butadiene rubbers (NBR); acrylic rubbers such as butyl acrylate rubbers, ethyl acrylate rubbers, and octyl acrylate rubbers; nitrile rubbers, isobutylene rubbers, methyl methacrylate-butyl acrylate block copolymers, ethylene-propylene copolymers (EPR), chlorosulfonated polyethylenes, silicone rubbers (millable type, room temperature vulcanizing type), butyl rubbers, fluororubbers, olefin-based thermoplastic elastomers, styrene-based thermoplastic elastomers, vinyl chloride-based thermoplastic elastomers, urethane-based thermoplastic elastomers, polyamide-based thermoplastic elastomers, polyester-based thermoplastic elastomers, fluorine-based thermoplastic elastomers, styrene-isobutylene-styrene block copolymers (SIBS), styrene-isoprene-styrene block copolymers (SIS), styrene-isobutylene block copolymers (SIB), styrene-butadiene-styrene block copolymers (SBS), styrene-ethylene/butene-styrene block copolymers (SEBS), styrene-ethylene/propylene-styrene block copolymers (SEPS), styrene-ethylene/ethylene/propylene-styrene block copolymers (SEEPS), and styrene-butadiene/butylene-styrene block copolymers (SBBS), to each of which an appropriate functional group may be added when it does not have the functional group in the basic backbone. These may be used alone or in combinations of two or more. From the standpoint of tire properties, butyl rubbers, SBR, and BR are preferred among these, with butyl rubbers being more preferred. Moreover, when two or more rubber components are used in combination, any one of them may have the functional group.

Any butyl rubber, any SBR, and any BR may be used, including those commonly used in the rubber industry. Usable commercial products are available from Sumitomo Chemical Co., Ltd., JSR Corporation, Asahi Kasei Corporation, Zeon Corporation, etc.

The amount of the rubber component(s) having the functional group based on 100% by mass of the rubber components is preferably 80% by mass or more, more preferably 90% by mass or more, still more preferably 95% by mass or more, and may be 100% by mass. When the amount is within the range indicated above, the advantageous effect tends to be better achieved.

The combined amount of the butyl rubbers, SBR, and BR based on 100% by mass of the rubber components is preferably 80% by mass or more, more preferably 90% by mass or more, still more preferably 95% by mass or more, and may be 100% by mass. When the combined amount is within the range indicated above, the advantageous effect tends to be better achieved.

The amount of the butyl rubbers based on 100% by mass of the rubber components is preferably 80% by mass or more, more preferably 90% by mass or more, still more preferably 95% by mass or more, and may be 100% by mass. When the amount is within the range indicated above, the advantageous effect tends to be better achieved.

The amount of the SBR based on 100% by mass of the rubber components is preferably 80% by mass or more, more preferably 90% by mass or more, still more preferably 95% by mass or more, and may be 100% by mass. When the amount is within the range indicated above, the advantageous effect tends to be better achieved.

Examples of the filler capable of generating a charge paired with the functional group in the rubber component include: rubber-reinforcing agents such as silica and carbon black; metal oxides such as zinc oxide, magnesium oxide, aluminum oxide, and titanium oxide; hydroxides such as aluminum hydroxide and magnesium hydroxide; alkaline earth metal salts such as calcium carbonate and magnesium sulfate; alkali metal salts such as sodium chloride and potassium chloride; and silicate minerals such as montmorillonite, bentonite, hectorite, saponite, and other smectites, sepiolite, vermiculite, chlorite, kaolinite, talc, mica, and clay. These may be used alone or in combinations of two or more. From the standpoint of tire properties, silica or carbon black is preferred among these, with silica being more preferred.

When the filler is silica or carbon black, it is considered that the hydroxy groups on its surface act as a negative charge to form reversible bonds with the rubber component. Moreover, when the filler is a metal oxide, it is considered that the metal ions are dissociated by the functional group in the rubber component to generate a positive charge, thereby forming reversible bonds with the rubber component. When the filler is a salt, it is considered that the salt is ionized to generate both positive and negative charges, one or both of which form reversible bonds with the functional group in the rubber component.

The filler may also have a structure partially modified with the above-described cationic functional group and/or anionic functional group to increase bonding to the functional group in the rubber component. Silica or carbon black is preferred as the filler to be modified in such a manner because it also contributes to excellent tire properties.

When the filler has a structure partially modified with the above-described cationic functional group and/or anionic functional group, the cationic functional group content of the filler is preferably 10% by mass or more, more preferably 15% by mass or more, still more preferably 20% by mass or more, but is preferably 70% by mass or less, more preferably 60% by mass or less, still more preferably 50% by mass or less. When the cationic functional group content is within the range indicated above, the advantageous effect tends to be better achieved. Similarly, when the filler contains the anionic functional group, the anionic functional group content is preferably 5% by mass or more, more preferably 10% by mass or more, still more preferably 15% by mass or more, particularly preferably 20% by mass or more, but is preferably 70% by mass or less, more preferably 60% by mass or less, still more preferably 50% by mass or less.

Moreover, the respective functional group contents of the filler can be determined from the rate of decrease in weight (mass) measured by TGA.

Any silica and any carbon black may be used, including those commonly used in the rubber industry. The silica may be commercially available from Evonik, Tosoh Silica Corporation, Solvay Japan, Tokuyama Corporation, etc. The carbon black may be commercially available from Asahi Carbon Co., Ltd., Cabot Japan K.K., Tokai Carbon Co., Ltd., Mitsubishi Chemical Corporation, Lion Corporation, NSCC Carbon Co., Ltd, Columbia Carbon, etc.

The nitrogen adsorption specific surface area ($N_2SA$) of the silica is preferably 100 $m^2/g$ or more, more preferably 150 $m^2/g$ or more, still more preferably 180 $m^2/g$ or more, but is preferably 250 $m^2/g$ or less, more preferably 220 $m^2/g$ or less, still more preferably 200 $m^2/g$ or less. When the $N_2SA$ is within the range indicated above, the silica is considered to easily interact with the polymer and at the same time to easily form ionic bonds, and therefore the advantageous effect tends to be well achieved. The nitrogen adsorption specific surface area of the silica is measured by a BET method in accordance with ASTM D3037-81.

The filler content per 100 parts by mass of the rubber components is preferably 10 parts by mass or more, more preferably 20 parts by mass or more, still more preferably 30 parts by mass or more, but is preferably 100 parts by mass or less, more preferably 60 parts by mass or less, still more preferably 45 parts by mass or less. When the filler content is not less than the lower limit, the reinforcement effect of ionic bonds tends to be well achieved. When the filler content is not more than the upper limit, the filler is more likely to form good ionic bonds, and the advantageous effect tends to be well achieved.

The silica may be used with a silane coupling agent.

Non-limiting examples of the silane coupling agent include sulfide silane coupling agents such as bis(3-triethoxysilylpropyl) tetrasulfide, bis(2-triethoxysilylethyl)tetrasulfide, bis(4-triethoxysilylbutyl)tetrasulfide, bis(3-trimethoxysilylpropyl)tetrasulfide, bis(2-trimethoxysilylethyl) tetrasulfide, bis(2-triethoxysilylethyl)trisulfide, bis(4-trimethoxysilylbutyl)trisulfide, bis(3-triethoxysilylpropyl) disulfide, bis(2-triethoxysilylethyl)disulfide, bis(4-triethoxysilylbutyl)disulfide, bis(3-trimethoxysilylpropyl) disulfide, bis(2-trimethoxysilylethyl)disulfide, bis(4-trimethoxysilylbutyl)disulfide, 3-trimethoxysilylpropyl-N,N-dimethylthiocarbamoyl tetrasulfide, 2-triethoxysilylethyl-N, N-dimethylthiocarbamoyl tetrasulfide, and 3-triethoxysilylpropyl methacrylate monosulfide; mercapto silane coupling agents such as 3-mercaptopropyltrimethoxysilane, 2-mercaptoethyltriethoxysilane, and NXT and NXT-Z both available from Momentive; vinyl silane coupling agents such as vinyltriethoxysilane and vinyltrimethoxysilane; amino silane coupling agents such as 3-aminopropyltriethoxysilane and 3-aminopropyltrimethoxysilane; glycidoxy silane coupling agents such as γ-glycidoxypropyltriethoxysilane and γ-glycidoxypropyltrimethoxysilane; nitro silane coupling agents such as 3-nitropropyltrimethoxysilane and 3-nitropropyltriethoxysilane; and chloro silane coupling agents such as 3-chloropropyltrimethoxysilane and 3-chloropropyltriethoxysilane. Usable commercial products are available from Evonik, Momentive, Shin-Etsu Silicone, Tokyo Chemical Industry Co., Ltd., AZmax. Co., Dow Corning Toray Co., Ltd., etc. These may be used alone or in combinations of two or more.

The silane coupling agent content per 100 parts by mass of the silica is preferably 3 parts by mass or more, more preferably 6 parts by mass or more, but is preferably 12 parts by mass or less, more preferably 8 parts by mass or less. When the silane coupling agent content is not less than the lower limit, the failure to hydrophobize the silica tends to be prevented due to the hydrophobic backbone of the rubber, resulting in good dispersion and therefore excellent strength. When the silane coupling agent content is not more than the upper limit, it is considered that the hydroxy groups on the silica surface can be prevented from reacting with the silane coupling agent, and good ionic bonds can be formed.

The rubber composition contains sulfur.

Examples of the sulfur include those commonly used in the rubber industry, such as powdered sulfur, precipitated sulfur, colloidal sulfur, insoluble sulfur, highly dispersible sulfur, and soluble sulfur. Usable commercial products are available from Tsurumi Chemical Industry Co., Ltd., Karuizawa Sulfur Co., Ltd., Shikoku Chemicals Corporation, Flexsys, Nippon Kanryu Industry Co., Ltd., Hosoi Chemical Industry Co., Ltd., etc. These may be used alone or in combinations of two or more.

The sulfur content per 100 parts by mass of the rubber components is preferably 0.3 parts by mass or more, more preferably 0.5 parts by mass or more, still more preferably 1 part by mass or more, but is preferably 6 parts by mass or less, more preferably 4 parts by mass or less, still more preferably 3 parts by mass or less. When the sulfur content is not less than the lower limit, the sulfur tends to form a sufficient network, resulting in good strength. When the sulfur content is not more than the upper limit, too strong a covalent bond network tends to be prevented, resulting in good polymer mobility. Here, the term "sulfur content" refers to the net amount of sulfur element based on the rubber components because it is considered that in addition to the powdered sulfur contained as a vulcanizing agent, the sulfur element or the like contained in the vulcanization accelerator, if present, may be involved in the formation of a network by sulfur.

Moreover, the net amount of sulfur can be determined by an oxygen combustion flask method in accordance with JIS K 6233:2016, or may be determined by quantifying the sulfur dioxide generated after oxygen combustion by infrared adsorption spectroscopy.

The rubber composition may contain a vulcanization accelerator.

Examples of the vulcanization accelerator include thiazole vulcanization accelerators such as 2-mercaptobenzothiazole and di-2-benzothiazolyl disulfide; thiuram vulcanization accelerators such as tetramethylthiuram disulfide (TMTD), tetrabenzylthiuram disulfide (TBzTD), and tetrakis(2-ethylhexyl)thiuram disulfide (TOT-N); sulfenamide vulcanization accelerators such as N-cyclohexyl-2-benzothiazylsulfenamide (CBS), N-tert-butyl-2-benzothiazolylsulfenamide (TBBS), N-oxyethylene-2-benzothiazole sulfenamide, and N,N'-diisopropyl-2-benzothiazole sulfenamide; and guanidine vulcanization accelerators such as diphenylguanidine, diorthotolylguanidine, and orthotolylbiguanidine. Usable commercial products are available from Sumitomo Chemical Co., Ltd., Ouchi Shinko Chemical Industrial Co., Ltd., etc. These may be used alone or in combinations of two or more.

The vulcanization accelerator content per 100 parts by mass of the rubber components is preferably 0.1 parts by mass or more, more preferably 0.5 parts by mass or more, but is preferably 4 parts by mass or less, more preferably 2 parts by mass or less. When the vulcanization accelerator content is within the range indicated above, the advantageous effect tends to be better achieved.

The rubber composition may contain zinc oxide.

The zinc oxide may be a conventional one, and usable commercial products are available from Mitsui Mining & Smelting Co., Ltd., Toho Zinc Co., Ltd., HakusuiTech Co., Ltd., Seido Chemical Industry Co., Ltd., Sakai Chemical Industry Co., Ltd., etc. Each of these may be used alone, or two or more of these may be used in combination. In the present disclosure, zinc oxide is considered to be able to activate a vulcanization reaction of the rubber, as conventionally known, and to also form reversible bonds with the functional group of the rubber component.

The zinc oxide content per 100 parts by mass of the rubber components is preferably 0.5 parts by mass or more, more preferably 0.8 parts by mass or more, still more preferably 1 part by mass or more, but is preferably 5 parts by mass or less, more preferably 3 parts by mass or less. When the zinc oxide content is within the range indicated above, the advantageous effect tends to be better achieved.

The rubber composition may contain a plasticizer. The term "plasticizer" refers to a material which can impart plasticity to rubber components, or a component which can be extracted with acetone. Examples include liquid plasticizers (plasticizers that are liquid at room temperature (25° C.)) and resins (resins that are solid at room temperature (25° C.)).

Examples of the liquid plasticizers include oils.

Examples of the oils include process oils, plant oils, and mixtures thereof. Examples of the process oils include paraffinic process oils, aromatic process oils, and naphthenic process oils. Examples of the plant oils include castor oil, cotton seed oil, linseed oil, rapeseed oil, soybean oil, palm oil, coconut oil, peanut oil, rosin, pine oil, pine tar, tall oil, corn oil, rice oil, safflower oil, sesame oil, olive oil, sunflower oil, palm kernel oil, *camellia* oil, jojoba oil, macadamia nut oil, and tung oil. Usable commercial products are available from Idemitsu Kosan Co., Ltd., Sankyo Yuka Kogyo K.K., JXTG Nippon Oil & Energy Corporation, Olisoy, H&R, Hokoku Corporation, Showa Shell Sekiyu K.K., Fuji Kosan Co., Ltd., etc. Each of these may be used alone, or two or more of these may be used in combination.

The oil content per 100 parts by mass of the rubber components is preferably 5 parts by mass or more, more preferably 10 parts by mass or more, still more preferably 20 parts by mass or more, but is preferably 40 parts by mass or less, more preferably 30 parts by mass or less. When the oil content is within the range indicated above, the advantageous effect tends to be better achieved.

Examples of the resins include adhesive resins.

Examples of the adhesive resins include those commonly used in the tire industry, including aromatic hydrocarbon resins such as phenol resins, alkylphenol resins, terpene resins, coumarone resins, indene resins, coumarone-indene resins, styrene resins, acrylic resins, rosin resins, and dicyclopentadiene resins (DCPD resins); aliphatic hydrocarbon resins such as C5 resins, C8 resins, C9 resins, and C5/C9 resins; and hydrogenated products of the foregoing resins. Usable commercial products are available from Maruzen Petrochemical Co., Ltd., Sumitomo Bakelite Co., Ltd., Yasuhara Chemical Co., Ltd., Tosoh Corporation, Rutgers Chemicals, BASF, Arizona Chemical, Nitto Chemical Co., Ltd., Nippon Shokubai Co., Ltd., JXTG Nippon Oil & Energy Corporation, Zeon Corporation, Harima Chemicals Group, Inc., Toagosei Co., Ltd., Arakawa Chemical Industries, Ltd., Taoka Chemical Co., Ltd., etc. These may be used alone or in combinations of two or more.

The adhesive resin content per 100 parts by mass of the rubber components is preferably 1 part by mass or more, more preferably 5 parts by mass or more, but is preferably 30 parts by mass or less, more preferably 20 parts by mass or less. When the adhesive resin content is within the range indicated above, the advantageous effect tends to be better achieved.

The rubber composition may contain a wax.

Non-limiting examples of the wax include petroleum waxes such as paraffin waxes and microcrystalline waxes; naturally-occurring waxes such as plant waxes and animal waxes; and synthetic waxes such as polymers of ethylene, propylene, or other similar monomers. Usable commercial products are available from Ouchi Shinko Chemical Industrial Co., Ltd., Nippon Seiro Co., Ltd., Seiko Chemical Co., Ltd., etc. Each of these may be used alone, or two or more of these may be used in combination.

The wax content per 100 parts by mass of the rubber components is preferably 0.5 parts by mass or more, more preferably 1 part by mass or more, but is preferably 5 parts by mass or less, more preferably 3 parts by mass or less. When the wax content is within the range indicated above, the advantageous effect tends to be better achieved.

The rubber composition may contain an antioxidant.

Examples of the antioxidant include naphthylamine antioxidants such as phenyl-α-naphthylamine; diphenylamine antioxidants such as octylated diphenylamine and 4,4'-bis (α,α'-dimethylbenzyl)diphenylamine; p-phenylenediamine antioxidants such as N-isopropyl-N'-phenyl-p-phenylenediamine, N-(1,3-dimethylbutyl)-N'-phenyl-p-phenylenediamine, and N,N'-di-2-naphthyl-p-phenylenediamine; quinoline antioxidants such as polymerized 2,2,4-trimethyl-1,2-dihydroquinoline; monophenolic antioxidants such as 2,6-di-t-butyl-4-methylphenol and styrenated phenol; and bis-, tris-, or polyphenolic antioxidants such as tetrakis[methylene-3-(3',5'-di-t-butyl-4'-hydroxyphenyl)propionate]methane. Usable commercial products are available from Seiko Chemical Co., Ltd., Sumitomo Chemical Co., Ltd., Ouchi Shinko Chemical Industrial Co., Ltd., Flexsys, etc. Each of these may be used alone, or two or more of these may be used in combination.

The antioxidant content per 100 parts by mass of the rubber components is preferably 0.5 parts by mass or more, more preferably 1 part by mass or more, but is preferably 6 parts by mass or less, more preferably 3 parts by mass or less. When the antioxidant content is within the range indicated above, the advantageous effect tends to be better achieved.

The rubber composition may contain stearic acid.

The stearic acid may be a conventional one and usable commercial products are available from NOF Corporation, Kao Corporation, Fujifilm Wako Pure Chemical Corporation, Chiba Fatty Acid Co., Ltd., etc. Each of these may be used alone, or two or more of these may be used in combination.

The stearic acid content per 100 parts by mass of the rubber components is preferably 1 part by mass or more, more preferably 2 parts by mass or more, but is preferably 10 parts by mass or less, more preferably 5 parts by mass or less. When the stearic acid content is within the range indicated above, the advantageous effect tends to be better achieved.

In addition to the above-mentioned components, the rubber composition may contain additives commonly used in the rubber industry, such as organic peroxides. The respective additive contents are each preferably 0.1 to 200 parts by mass per 100 parts by mass of the rubber components.

To suitably achieve the advantageous effect, the rubber composition preferably satisfies the following relationship with respect to the filler content (parts by mass) per 100 parts by mass of the rubber components and the sulfur content (parts by mass) per 100 parts by mass of the rubber components:

$$\text{Filler content/Sulfur content} \times 100 \leq 40.$$

The upper limit of the value of "Filler content/Sulfur content" is preferably 35 or less, more preferably 25 or less. The lower limit is not limited but is preferably 10 or more, more preferably 15 or more. When the value is within the range indicated above, it is considered that self-healing bonds and sulfur covalent bonds are more likely to be formed at the same time, and the formation of sulfur bonds in a poly-crosslinked form is also promoted, resulting in good wet grip performance and good strength.

The rubber composition may be prepared, for example, by kneading the components using a rubber kneading machine such as an open roll mill or a Banbury mixer, and then vulcanizing the kneaded mixture.

The kneading conditions are as follows. In a base kneading step of kneading additives other than sulfur and vulcanization accelerators, the kneading temperature is usually 100 to 180° C., preferably 120 to 170° C. In a final kneading step of kneading sulfur and vulcanization accelerators, the kneading temperature is usually 120° C. or lower, preferably 85 to 110° C. Then, the composition obtained after kneading sulfur and vulcanization accelerators is usually vulcanized by, for example, press vulcanization. The vulcanization temperature is usually 140 to 190° C., preferably 150 to 185° C. The vulcanization time is usually 5 to 15 minutes.

The rubber composition is suitable for use in a tread (cap tread) of a tire.

The pneumatic tire of the present disclosure can be produced from the above-described rubber composition by usual methods.

Specifically, the rubber composition before vulcanization may be extruded into the shape of a tread and assembled with other tire components in a usual manner on a tire building machine to build an unvulcanized tire, which may then be heated and pressurized in a vulcanizer to produce a tire.

The pneumatic tire may be used as a tire for passenger vehicles, heavy duty vehicles such as trucks and buses, light trucks, or motorcycles, or as a racing tire (high performance tire), etc. The tire may also be used as an all season tire, a summer tire, or a studless winter tire (winter tire), etc.

The term "tire for passenger vehicles" refers to a tire which may be mounted on a vehicle that is supposed to run on four wheels and which has a normal load of 1,000 kg or less.

The term "normal load" refers to a load specified for each tire by the standards in a standard system including standards according to which tires are provided, and may be "maximum load capacity" in JATMA, a maximum value shown in Table "TIRE LOAD LIMITS AT VARIOUS COLD INFLATION PRESSURES" in TRA, or "load capacity" in ETRTO.

EXAMPLES

The present disclosure is specifically described with reference to, but not limited to, examples.

The chemicals used in the examples and comparative examples are listed below.

Rubber 1: below-described Production Example 1 (a butyl rubber having a cationic functional group (1-butylimidazole group) and an anionic functional group (bromo group); cationic functional group: 1.0% by mass; anionic functional group: 1.0% by mass)

Rubber 2: BROMOBUTYL2255 available from Exxon-Mobil Chemical (a butyl rubber having an anionic functional group (bromo group); anionic functional group: 1.0% by mass)

Rubber 3: latex available from Zeon Corporation (a SBR having an anionic functional group (carboxylic acid group); anionic functional group: 30% by mass)

Rubber 4: below-described Production Example 2 (a SBR having a cationic functional group (amine group); cationic functional group: 30% by mass)

Filler 1: ULTRASIL VN3 available from Evonik (a silica having an anionic functional group (hydroxy group); anionic functional group: 5% by mass; $N_2SA$: 180 $m^2/g$)

Filler 2: below-described Production Example 3 (a silica having a cationic functional group (1-butylimidazole group) and an anionic functional group (bromo group); cationic functional group: 10% by mass; anionic functional group: 10% by mass)

Filler 3: below-described Production Example 4 (a silica having an anionic functional group (bromo group); anionic functional group: 10% by mass)

Filler 4: below-described Production Example 5 (a silica having a cationic functional group (amino group); cationic functional group: 10% by mass)

Filler 5: clay, Hard Clay Crown available from Southeastern Clay Company (average particle size: 0.6 μm)

Filler 6: aluminum hydroxide, APYRAL200SM available from Nabaltec (average particle size: 0.6 μm)

Filler 7: carbon black, SHOBLACK N220 available from Cabot Japan K.K. ($N_2SA$: 114 $m^2/g$)

Filler 8: calcium carbonate, HAKUENKA CC available from Shiraishi Kogyo Kaisha, Ltd. (average particle size: 1 μm)

Filler 9: magnesium oxide, Kyowamag 150 available from Kyowa Chemical Industry Co., Ltd.

Zinc oxide: zinc oxide #2 available from Mitsui Mining & Smelting Co., Ltd.

Sulfur: powdered sulfur available from Tsurumi Chemical Industry Co., Ltd.

Vulcanization accelerator: NOCCELER NS (N-tert-butyl-2-benzothiazylsulfenamide, TBBS) available from Ouchi Shinko Chemical Industrial Co., Ltd.

Production Example 1

An amount of 100 parts by mass of bromobutyl rubber (rubber 2) and 3 parts by mass of 1-butylimidazole were kneaded in a 1.7 L Banbury mixer (Kobe Steel, Ltd.) at 130° C. for three minutes to obtain rubber 1.

Production Example 2

A sufficiently nitrogen-purged heat-resistant vessel was charged with 1,500 mL of n-hexane, 100 mmol of styrene, 800 mmol of 1,3-butadiene, 5 mmol of p-methoxystyrene, 0.2 mmol of tetramethylethylenediamine, 0.12 mmol of dimethylamine (modifier), and 0.12 mmol of n-butyllithium, followed by stirring at 0° C. for 48 hours. Then, the reaction was terminated by adding an alcohol, and 1 g of 2,6-tert-butyl-p-cresol was added to the reaction solution, followed by purification by reprecipitation. Accordingly, rubber 4 was obtained.

Production Example 3

An amount of 40 mL of 3-bromopropyltrimethoxysilane and 20 mL of 1-imidazole were stirred in a dry flask at room temperature for five days to obtain 1-butyl-3-trimethoxysilylpropylimidazolium bromide.

Next, 120 g of silica (filler 1) and 700 mL of toluene were added to a flask equipped with a reflux condenser. Thereto was added an excessive amount of 1-butyl-3-trimethoxysilylpropylimidazolium bromide with stirring, and the mixture was refluxed with heating at 120° C. for 24 hours. Then, the methanol generated by the reaction was removed, followed by cooling.

Subsequently, the silica particles were collected by centrifugation, and thoroughly washed with methanol and then dried at 110° C. for 12 hours to obtain filler 2.

Production Example 4

An amount of 40 g of silica (filler 1) and 700 mL of toluene were added to a flask equipped with a reflux condenser. Thereto was added an excessive amount of 3-bromopropyltrimethoxysilane with stirring, and the mixture was refluxed with heating at 120° C. for 24 hours. Then, the methanol generated by the reaction was removed, followed by cooling.

Subsequently, the silica particles were collected by centrifugation, and thoroughly washed with methanol and then dried at 110° C. for 12 hours to obtain filler 3.

Production Example 5

An amount of 40 g of silica (filler 1) and 700 mL of toluene were added to a flask equipped with a reflux condenser. Thereto was added an excessive amount of [3-(N,N-dimethylamino)propyl]trimethoxysilane with stirring, and the mixture was refluxed with heating at 120° C. for 24 hours. Then, the methanol generated by the reaction was removed, followed by cooling.

Subsequently, the silica particles were collected by centrifugation, and thoroughly washed with methanol and then dried at 110° C. for 12 hours to obtain filler 4.

Examples and Comparative Examples

According to the formulation recipe shown in the tables, the materials other than the sulfur and vulcanization accelerator were kneaded using a 1.7 L Banbury mixer (Kobe Steel, Ltd.) at 150° C. for five minutes to give a kneaded mixture. Then, the kneaded mixture was kneaded with the sulfur and vulcanization accelerator in an open roll mill at 80° C. for five minutes to give an unvulcanized rubber composition (elastomer composition).

The unvulcanized rubber composition was press-vulcanized in a 2 mm-thick mold at 170° C. for 10 minutes to obtain a vulcanized rubber composition.

The vulcanized rubber compositions prepared as above were subjected to the following evaluations. Tables 1 to 4 show the results. In the evaluations, the reference examples in Tables 1, 2, 3, and 4 are Comparative Examples A1, B1, C1, and D1, respectively. With regard to the "Filler content/Sulfur content" in Tables 1 to 4, the sulfur content (% by mass) of each specimen (vulcanized rubber composition) was determined by an oxygen combustion flask method in accordance with JIS K 6233:2016.

(Strength Index)

The tensile strength at break (TB) was measured by a tensile test performed on No. 5 dumbbell specimens of each vulcanized rubber composition in accordance with JIS K 6251 "Rubber, vulcanized or thermoplastics-Determination of tensile stress-strain properties". Then, the TB of each formulation example is expressed as an index relative to that of the reference example taken as 100. A higher index indicates a higher TB and better strength.

(Wet Grip Performance Index)

The tan δ of each vulcanized rubber composition was measured using a viscoelastic spectrometer VES (Iwamoto Seisakusho Co., Ltd.) at a measurement temperature of 0° C., an initial strain of 10%, a dynamic strain of 2.5%, and a frequency of 10 Hz, and expressed as an index relative to that of the reference example taken as 100. A higher index indicates a higher tan δ at 0° C. and better wet grip performance.

TABLE 1

| | | Comparative Example | | | | | | | | | | Example |
|---|---|---|---|---|---|---|---|---|---|---|---|---|
| | | A1 | A2 | A3 | A4 | A5 | A6 | A7 | A8 | A9 | A10 | A1 |
| Formulation (parts by mass) | Rubber 1 | 100 | 100 | 100 | 100 | 100 | 100 | 100 | 100 | 100 | 100 | 100 |
| | Filler 1 | | 30 | | | | | | | | | |
| | Filler 2 | | | 30 | | | | | | | | 30 |
| | Filler 3 | | | | | | | | | | | |
| | Filler 4 | | | | | | | | | | | |
| | Filler 5 | | | | 30 | | | | | | | |
| | Filler 6 | | | | | | 30 | | | | | |
| | Filler 7 | | | | | | | 30 | | | | |
| | Filler 8 | | | | | | | | 30 | | | |
| | Filler 9 | | | | | | | | | 30 | | |
| | Zinc oxide | | | | | 30 | | | | | | 1 |
| | Sulfur | | | | | | | | | | 1 | 0.5 |
| | Vulcanization accelerator | | | | | | | | | | 0.5 | 0.5 |
| Filler content/Sulfur content | | | | | | | | | | | | 48.8 |
| Evaluation | Strength index | 100 | 120 | 117 | 126 | 142 | 139 | 153 | 116 | 131 | 139 | 155 |
| | Wet grip performance index | 100 | 107 | 105 | 110 | 115 | 110 | 100 | 105 | 105 | 97 | 143 |

| | | Example | | | | | | | | | |
|---|---|---|---|---|---|---|---|---|---|---|---|
| | | A2 | A3 | A4 | A5 | A6 | A7 | A8 | A9 | A10 | A11 |
| Formulation (parts by mass) | Rubber 1 | 100 | 100 | 100 | 100 | 100 | 100 | 100 | 100 | 100 | 100 |
| | Filler 1 | | | | | 30 | | | | | |
| | Filler 2 | 30 | | | | | | | | | |
| | Filler 3 | | 30 | | | | | | | | |
| | Filler 4 | | | 30 | | | | | | | |
| | Filler 5 | | | | 30 | | | | | | |
| | Filler 6 | | | | | | 30 | | | | |
| | Filler 7 | | | | | | | 30 | | | |
| | Filler 8 | | | | | | | | 30 | | |
| | Filler 9 | | | | | | | | | | 30 |
| | Zinc oxide | 1 | 1 | 1 | 1 | 1 | 30 | 1 | 1 | 1 | 1 |
| | Sulfur | 1 | 1 | 1 | 1 | 1 | 1 | 1 | 1 | 1 | 1 |
| | Vulcanization accelerator | 0.5 | 0.5 | 0.5 | 0.5 | 0.5 | 0.5 | 0.5 | 0.5 | 0.5 | 0.5 |
| Filler content/Sulfur content | | 27.3 | 27.3 | 27.3 | 27.3 | 27.3 | 27.3 | 27.3 | 27.3 | 27.3 | 27.3 |
| Evaluation | Strength index | 164 | 156 | 152 | 162 | 154 | 174 | 169 | 187 | 142 | 159 |
| | Wet grip performance index | 141 | 137 | 140 | 124 | 134 | 141 | 134 | 122 | 128 | 128 |

TABLE 2

| | | Comparative Example | | | | Example | | |
|---|---|---|---|---|---|---|---|---|
| | | B1 | B2 | B3 | B4 | B1 | B2 | B3 |
| Formulation (parts by mass) | Rubber 2 | 100 | 100 | 100 | 100 | 100 | 100 | 100 |
| | Filler 1 | | 30 | | | | | |
| | Filler 2 | | | 30 | | 30 | 30 | |
| | Filler 4 | | | | | | | 30 |
| | Zinc oxide | | | | | 1 | 1 | 1 |
| | Sulfur | | | | 1 | 0.5 | 1 | 1 |
| | Vulcanization accelerator | | | | 0.5 | 0.5 | 0.5 | 0.5 |
| Filler content/Sulfur content | | | | | | 48.8 | 27.3 | 27.3 |
| Evaluation | Strength index | 100 | 129 | 116 | 125 | 156 | 161 | 154 |
| | Wet grip performance index | 100 | 110 | 118 | 88 | 131 | 126 | 124 |

TABLE 3

| | | Comparative Example | | | | Example | | |
|---|---|---|---|---|---|---|---|---|
| | | C1 | C2 | C3 | C4 | C1 | C2 | C3 |
| Formulation (parts by mass) | Rubber 3 | 100 | 100 | 100 | 100 | 100 | 100 | 100 |
| | Filler 1 | | 30 | | | | | |
| | Filler 2 | | | 30 | | 30 | 30 | |
| | Filler 4 | | | | | | | 30 |
| | Zinc oxide | | | | | 1 | 1 | 1 |
| | Sulfur | | | | 1 | 0.5 | 1 | 1 |
| | Vulcanization accelerator | | | | 0.5 | 0.5 | 0.5 | 0.5 |
| Filler content/Sulfur content | | | | | | 48.8 | 27.3 | 27.3 |
| Evaluation | Strength index | 100 | 128 | 122 | 130 | 146 | 151 | 153 |
| | Wet grip performance index | 100 | 125 | 129 | 90 | 141 | 137 | 140 |

TABLE 4

| | | Comparative Example | | | | Example | | | |
|---|---|---|---|---|---|---|---|---|---|
| | | D1 | D2 | D3 | D4 | D1 | D2 | D3 | D4 |
| Formulation (parts by mass) | Rubber 4 | 100 | 100 | 100 | 100 | 100 | 100 | 100 | 100 |
| | Filler 1 | | 30 | | | | | | 30 |
| | Filler 2 | | | 30 | | 30 | 30 | | |
| | Filler 3 | | | | | | | 30 | |
| | Zinc oxide | | | | 1 | 1 | 1 | 1 | 1 |
| | Sulfur | | | | 1 | 0.5 | 1 | 1 | 1 |
| | Vulcanization accelerator | | | | 0.5 | 0.5 | 0.5 | 0.5 | 0.5 |
| Filler content/Sulfur content | | | | | | 48.8 | 27.3 | 27.3 | 27.3 |
| Evaluation | Strength index | 100 | 135 | 121 | 138 | 152 | 159 | 166 | 152 |
| | Wet grip performance index | 100 | 119 | 123 | 84 | 130 | 126 | 123 | 127 |

As shown in Tables 1 to 4, excellent strength and wet grip performance were exhibited by the examples which contained a rubber component having a functional group containing a cationic functional group and/or an anionic functional group, a filler capable of generating a charge paired with the functional group, and sulfur.

The invention claimed is:
1. A rubber composition, comprising:
a rubber component having a functional group containing at least one of a cationic functional group or an anionic functional group;
a filler capable of generating a charge paired with the functional group; and
sulfur;
wherein the rubber component has:
a cationic functional group content of 0.5 to 30% by mass, and the filler has an anionic functional group content of 5 to 70% by mass, or
an anionic functional group content of 0.5 to 30% by mass, and the filler has a cationic functional group content of 10 to 70% by mass, or
both.

2. The rubber composition according to claim 1, wherein the functional group contains a cationic functional group and an anionic functional group.

3. The rubber composition according to claim 1, wherein the filler contains at least one of a cationic functional group or an anionic functional group.

4. The rubber composition according to claim 1, wherein the rubber component comprises at least one selected from the group consisting of butyl rubbers, styrene-butadiene rubbers, and polybutadiene rubbers.

5. The rubber composition according to claim 1, wherein the filler comprises at least one selected from the group consisting of silica and carbon black.

6. The rubber composition according to claim 1, wherein the cationic functional group contains at least one selected from the group consisting of a pyridine group, an imidazole group, a thiazole group, and an amino group, and the anionic functional group contains at least one selected from the group consisting of a halogen group and a carboxylic acid group.

7. The rubber composition according to claim 1, wherein the cationic functional group contains an imidazole group, and the anionic functional group contains a halogen group.

8. The rubber composition according to claim 1, wherein the rubber composition has a sulfur content of 0.3 to 6 parts by mass per 100 parts by mass of rubber components in the rubber composition.

9. The rubber composition according to claim 1, wherein the rubber component comprises at least one selected from the group consisting of butyl rubbers having a 1-butylimidazole group and a bromo group, butyl rubbers having a bromo group, styrene-butadiene rubbers having a carboxylic acid group, and styrene-butadiene rubbers having an amine group, and the filler comprises at least one selected from the group consisting of silica having a hydroxy group, silica having a 1-butylimidazole group and a bromo group, silica having a bromo group, and silica having an amino group.

10. The rubber composition according to claim 1, satisfying the following relationship:

Filler content/Sulfur content×100≤40.

11. The rubber composition according to claim 1, which is for use in a tread of a tire.

12. A pneumatic tire, comprising a tread comprising the rubber composition according to claim 1.

\* \* \* \* \*